USOO6697882B1

(12) United States Patent
Matsui

(10) Patent No.: US 6,697,882 B1
(45) Date of Patent: Feb. 24, 2004

(54) MEMORY CONTROLLER AND METHOD CONTROL METHOD, AND RENDERING DEVICE AND PRINTING DEVICE USING THE SAME

(75) Inventor: Nobuaki Matsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 607 days.

(21) Appl. No.: 09/598,198

(22) Filed: Jun. 21, 2000

(30) Foreign Application Priority Data

Jun. 25, 1999 (JP) .......................................... 11-180839

(51) Int. Cl.[7] ................................................ G06F 3/00
(52) U.S. Cl. ................................. 710/6; 710/5; 710/22; 711/137; 711/143; 711/155
(58) Field of Search ............................. 400/61, 70, 76; 710/22, 100, 5, 6; 711/137, 143, 155

(56) References Cited

U.S. PATENT DOCUMENTS

| 5,822,616 A | * | 10/1998 | Hirooka ....................... 711/137 |
| 5,978,866 A | * | 11/1999 | Nain ............................. 710/22 |
| 6,012,106 A | * | 1/2000 | Schumann et al. ............ 710/22 |
| 6,493,774 B2 | * | 12/2002 | Suzuki et al. ................ 710/100 |

* cited by examiner

*Primary Examiner*—Jeffrey Gaffin
*Assistant Examiner*—Joshua D Schneider
(74) *Attorney, Agent, or Firm*—Fitzpatrick, Cella, Harper & Scinto

(57) ABSTRACT

A rendering processor has source, pattern, destination prefetch/write units and DMA controllers. Each DMA controller enqueues a transaction such as a memory read/write in a transaction queue. A memory controller processes transactions in the queue in the FIFO order. A prefetch unit determines whether or not data is prefetched to a line end, and if the determination is affirmative, postpones a prefetch until completion of the write-back of the prefetched data.

16 Claims, 20 Drawing Sheets

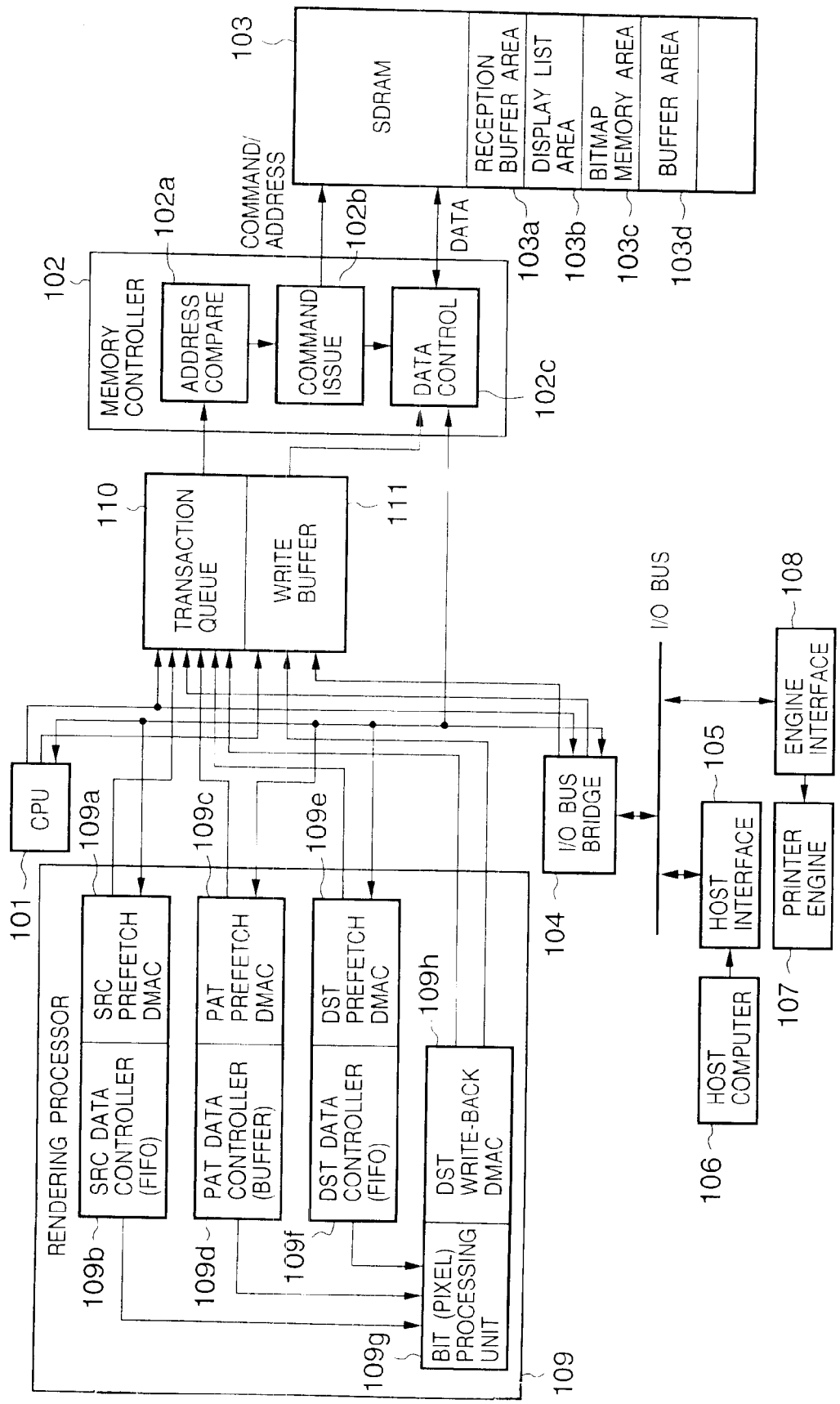

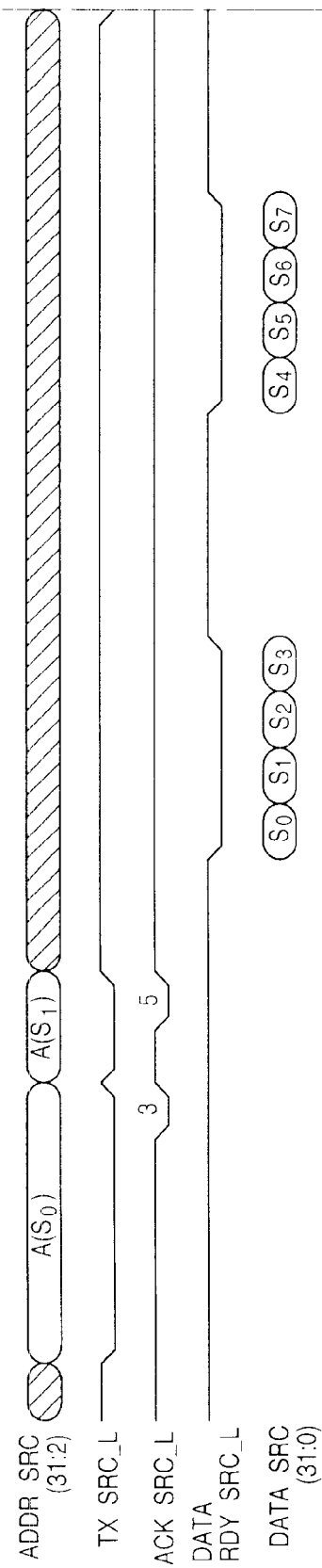

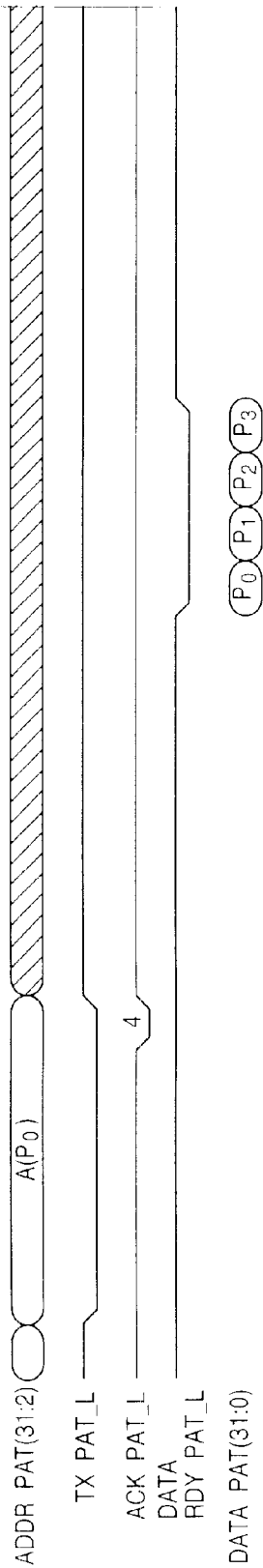

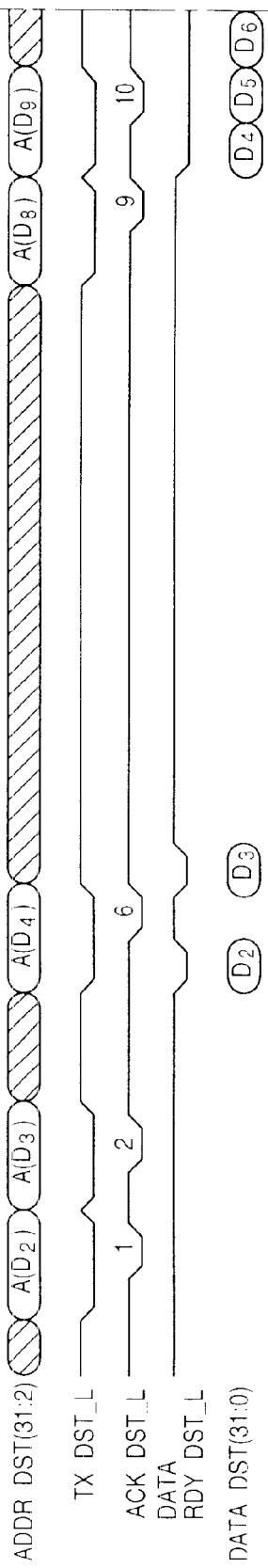

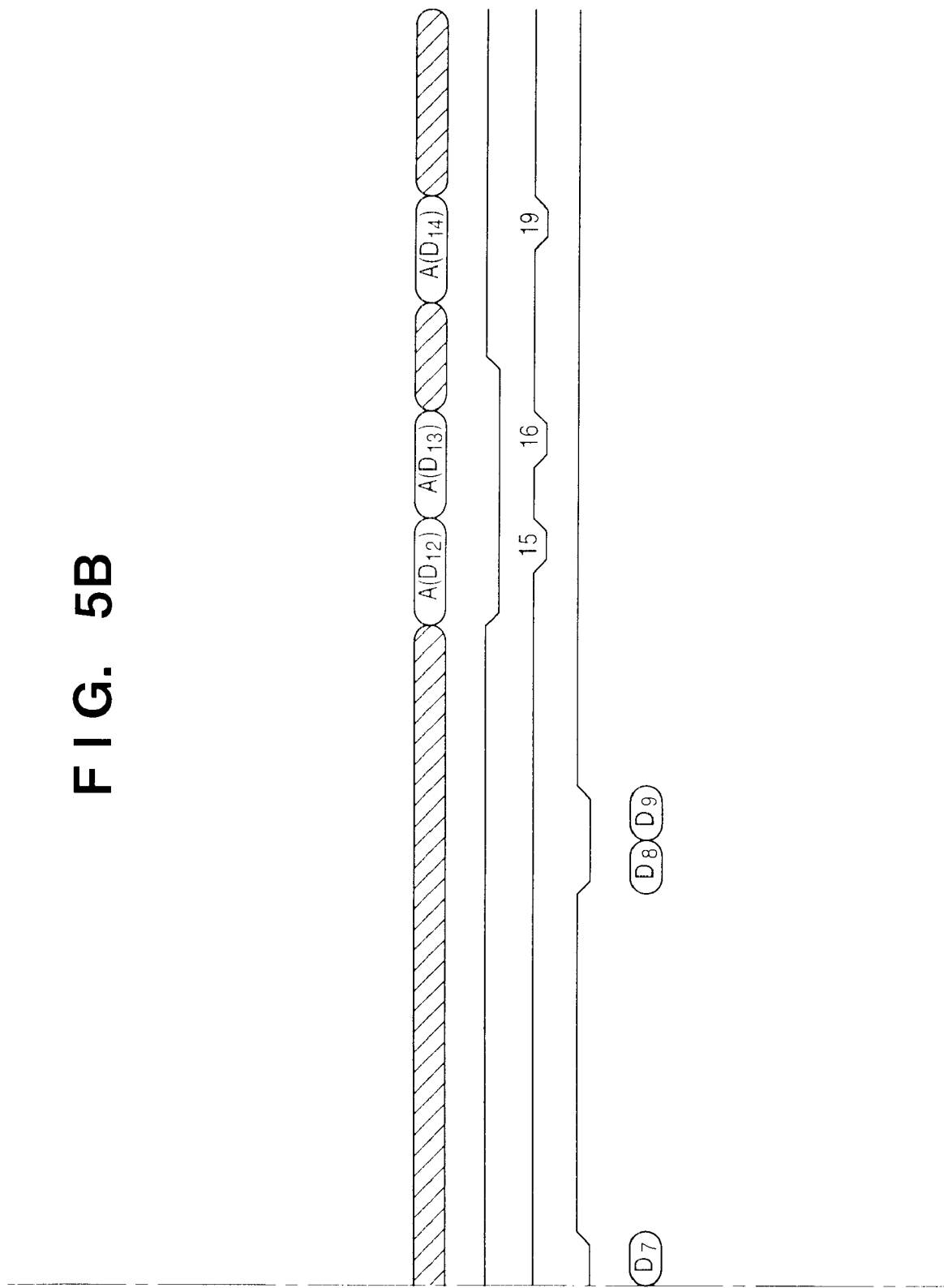

| FIG. 7A | FIG. 7B |

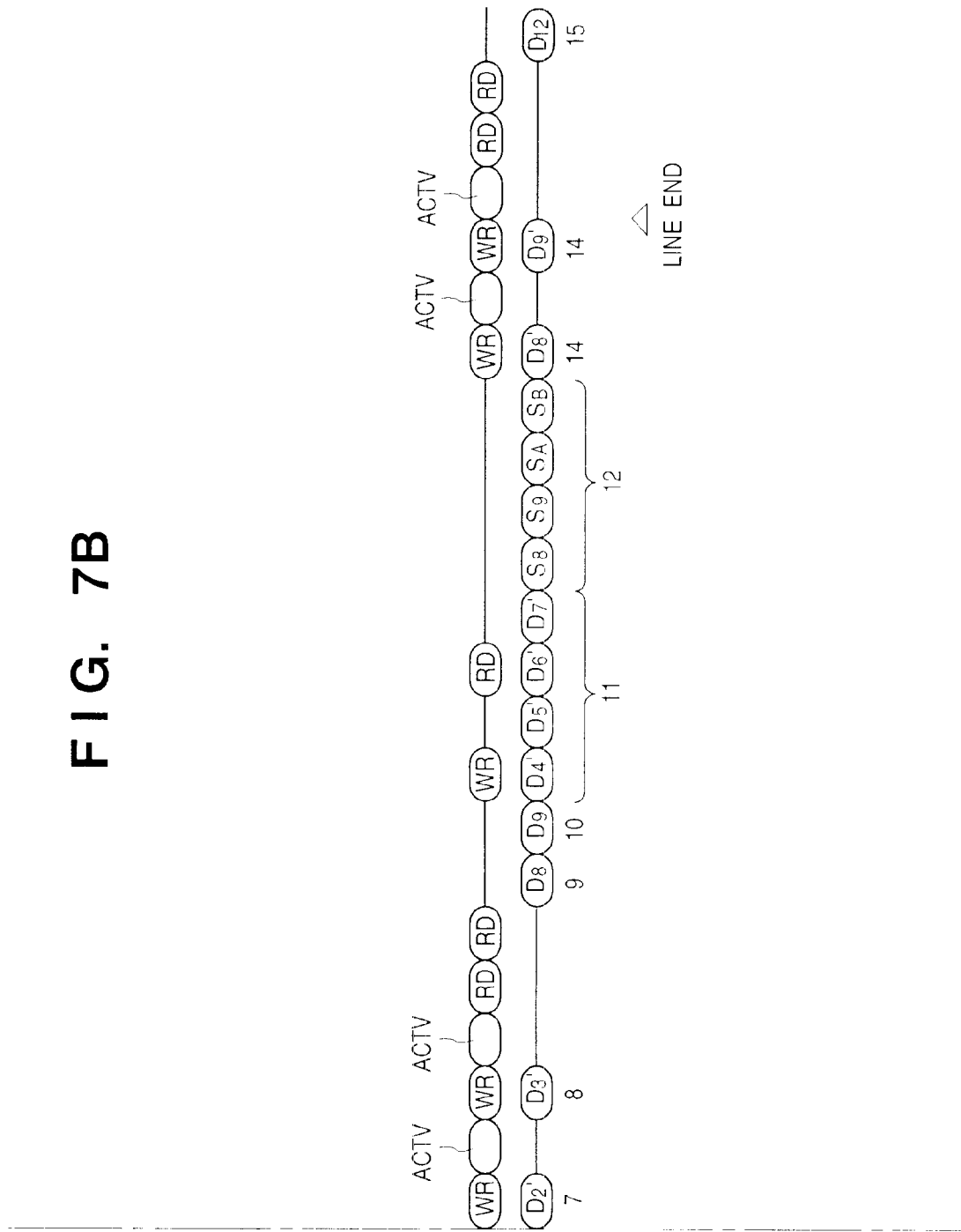

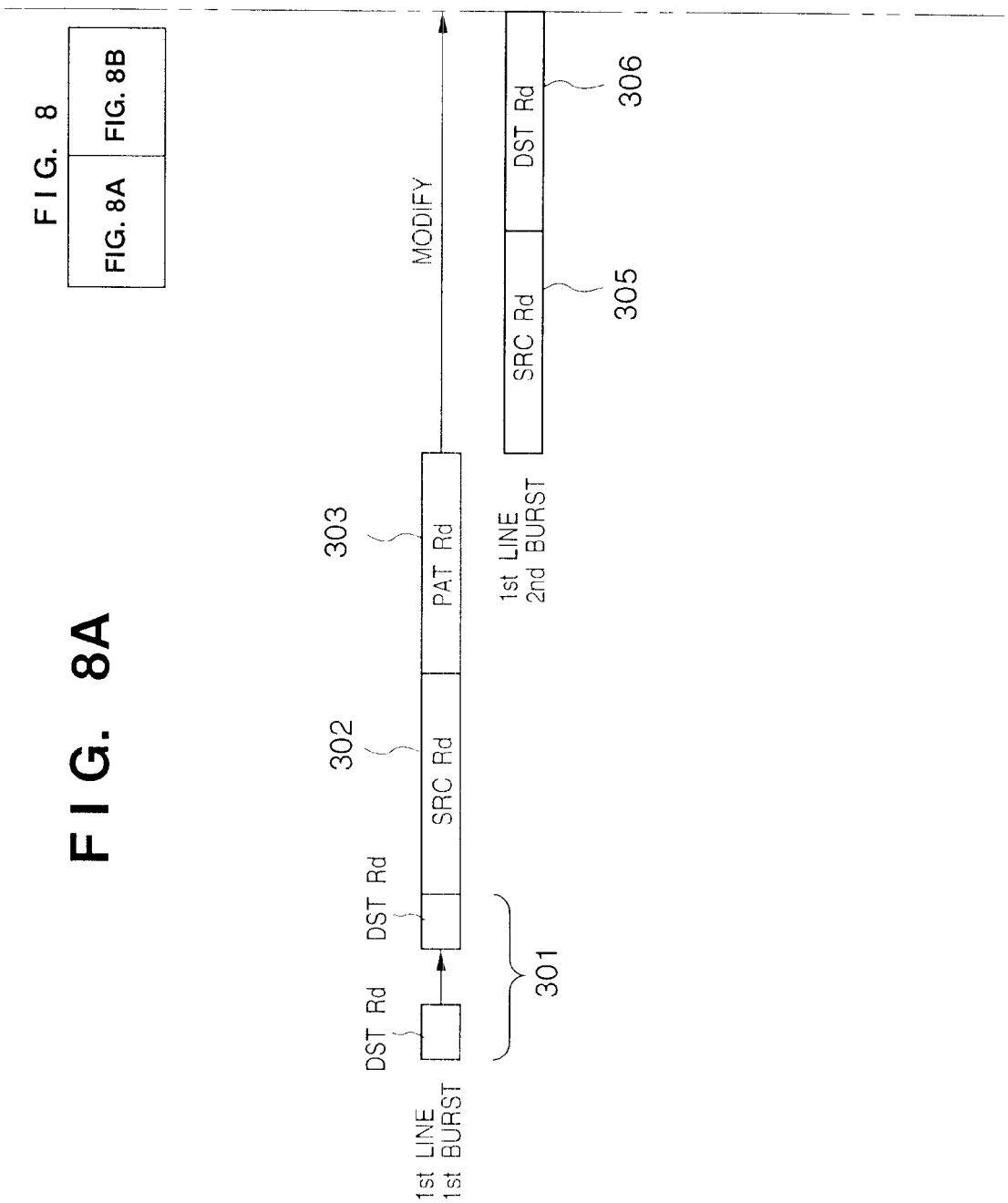

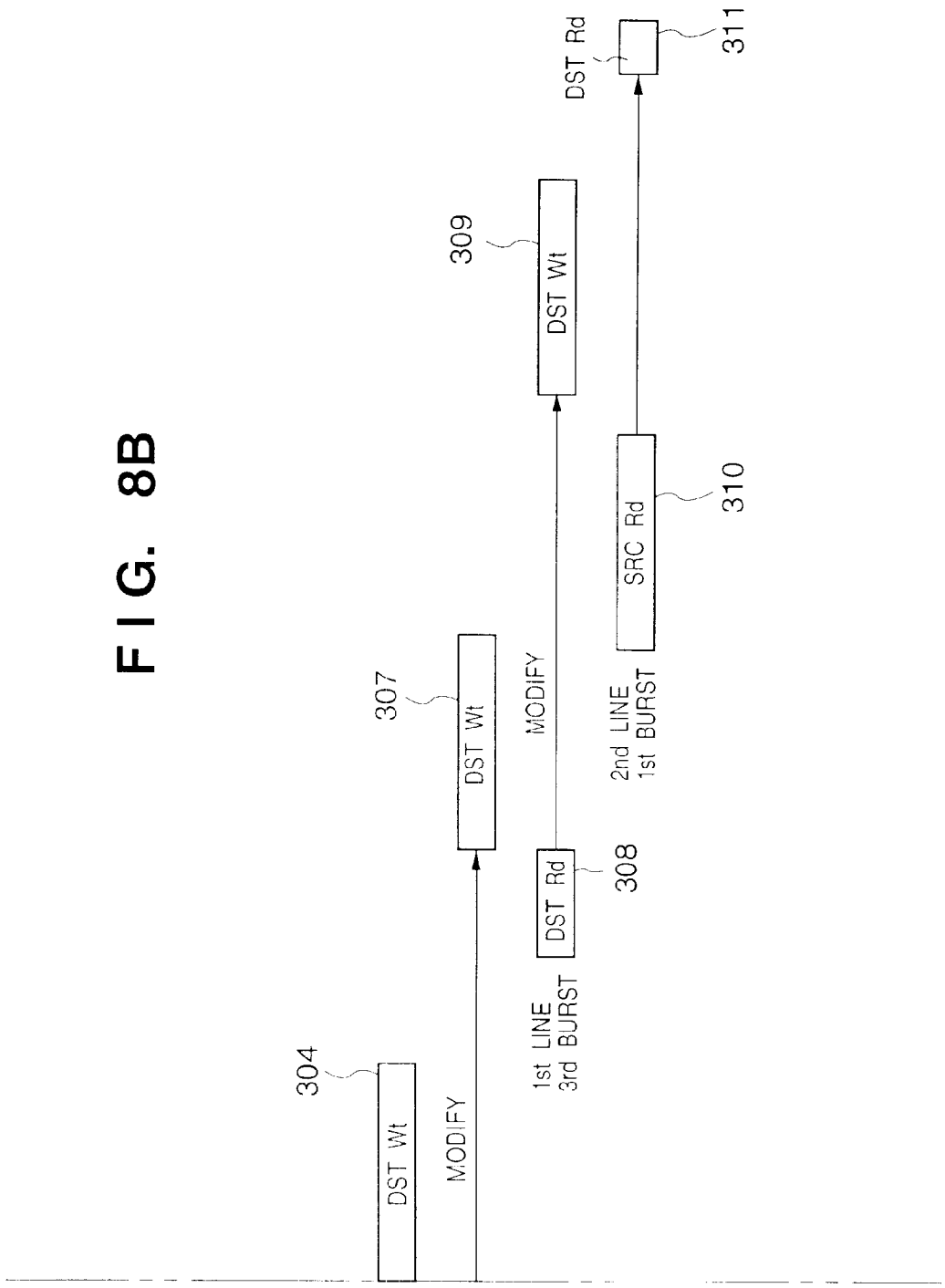

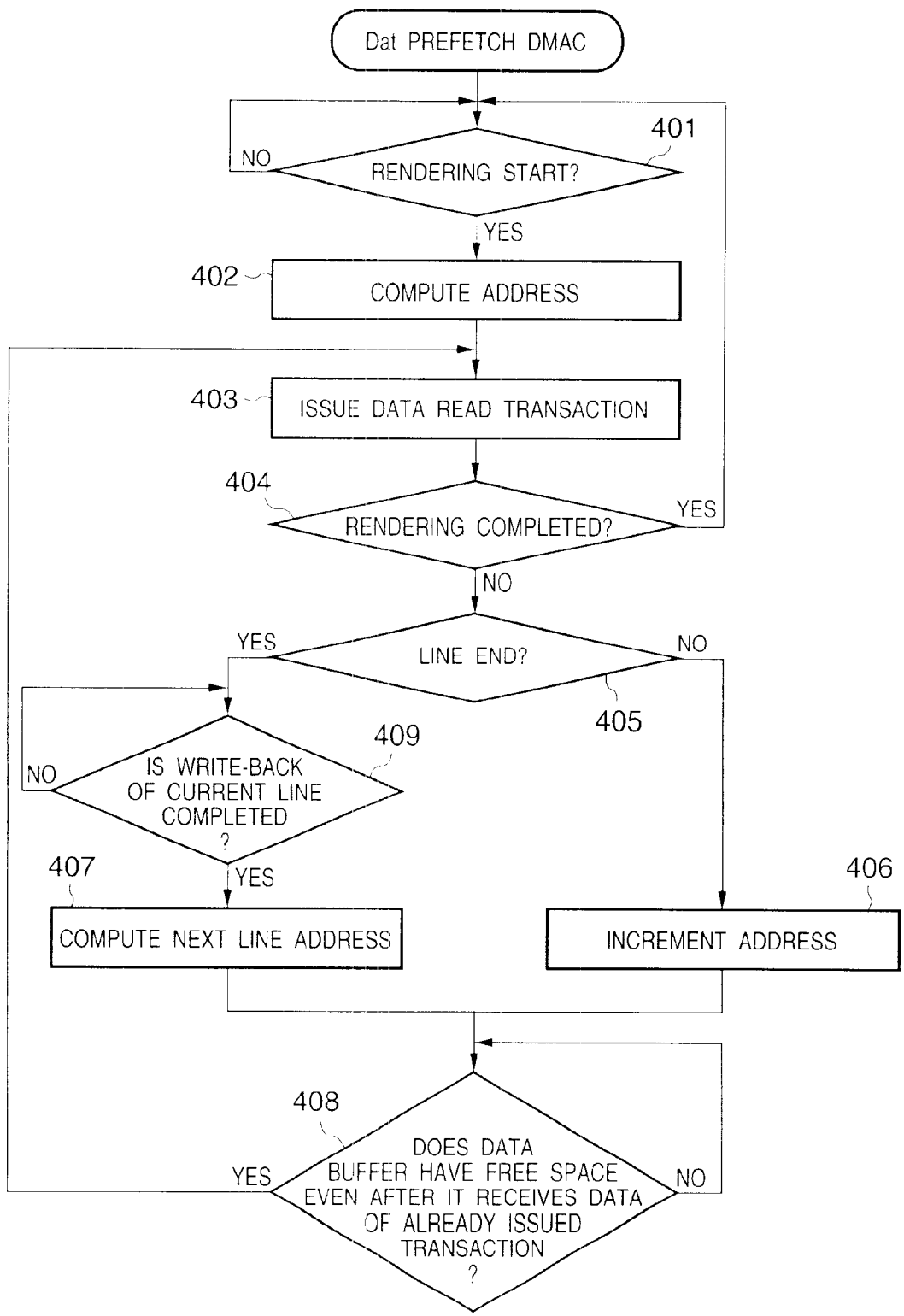

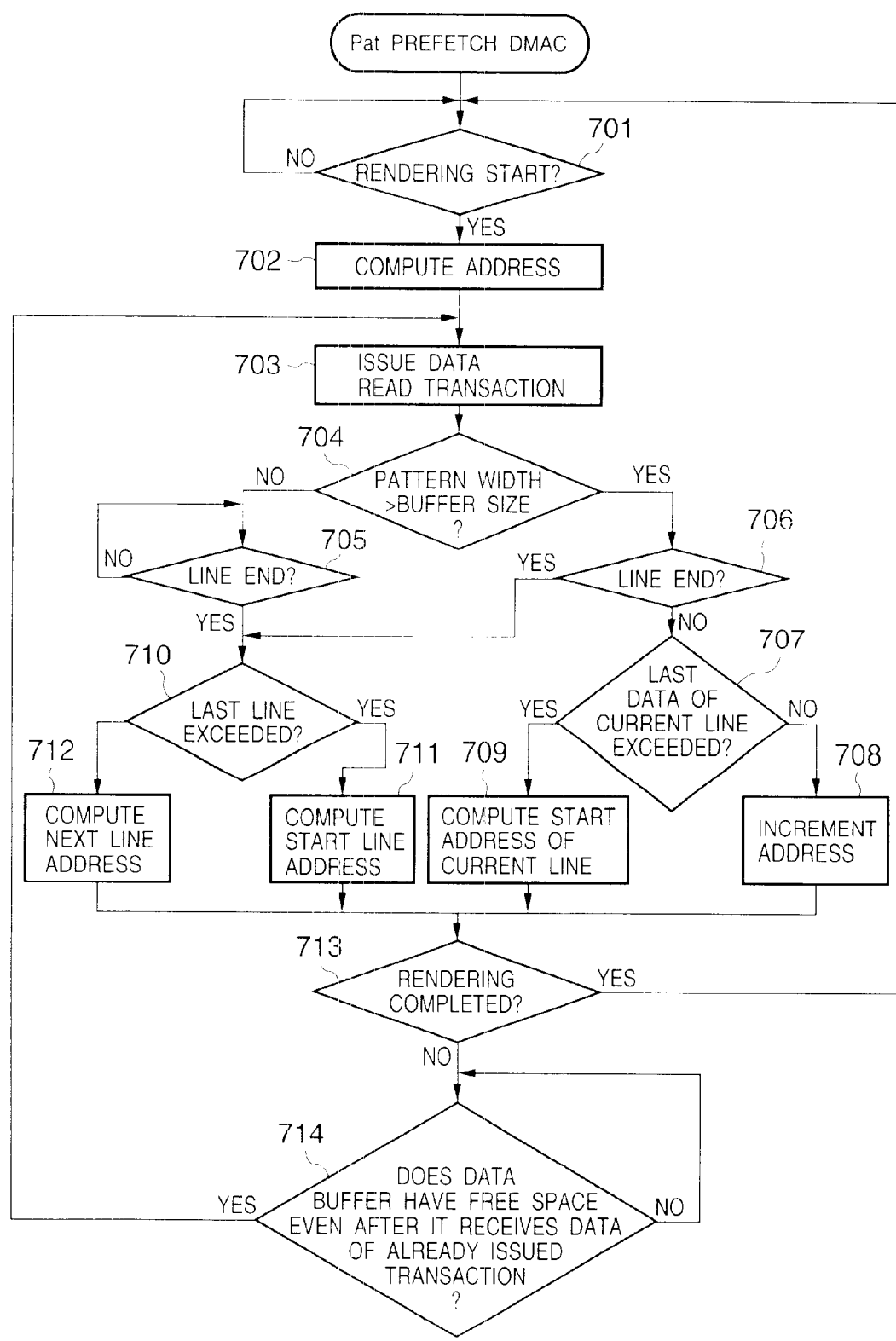

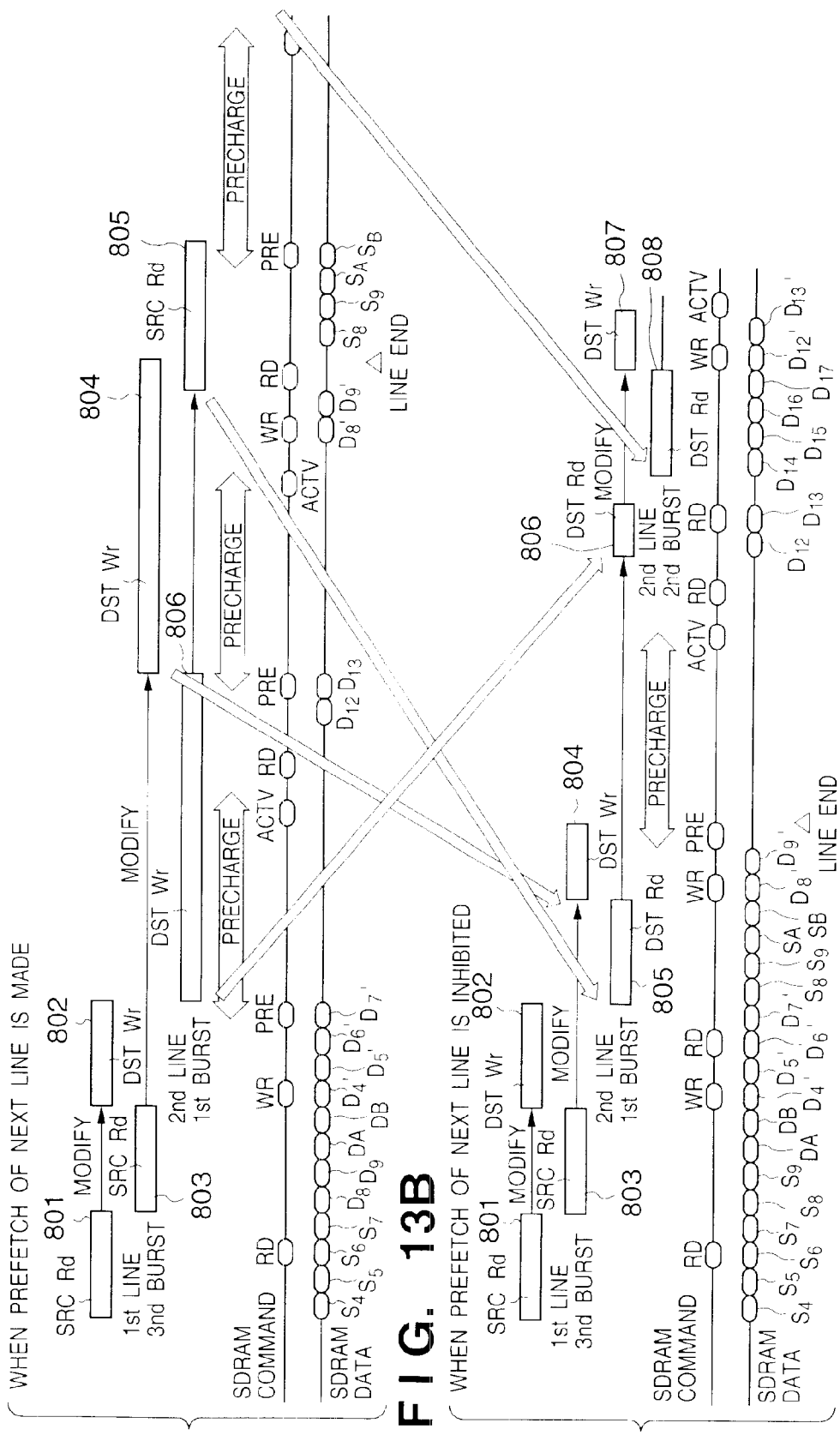

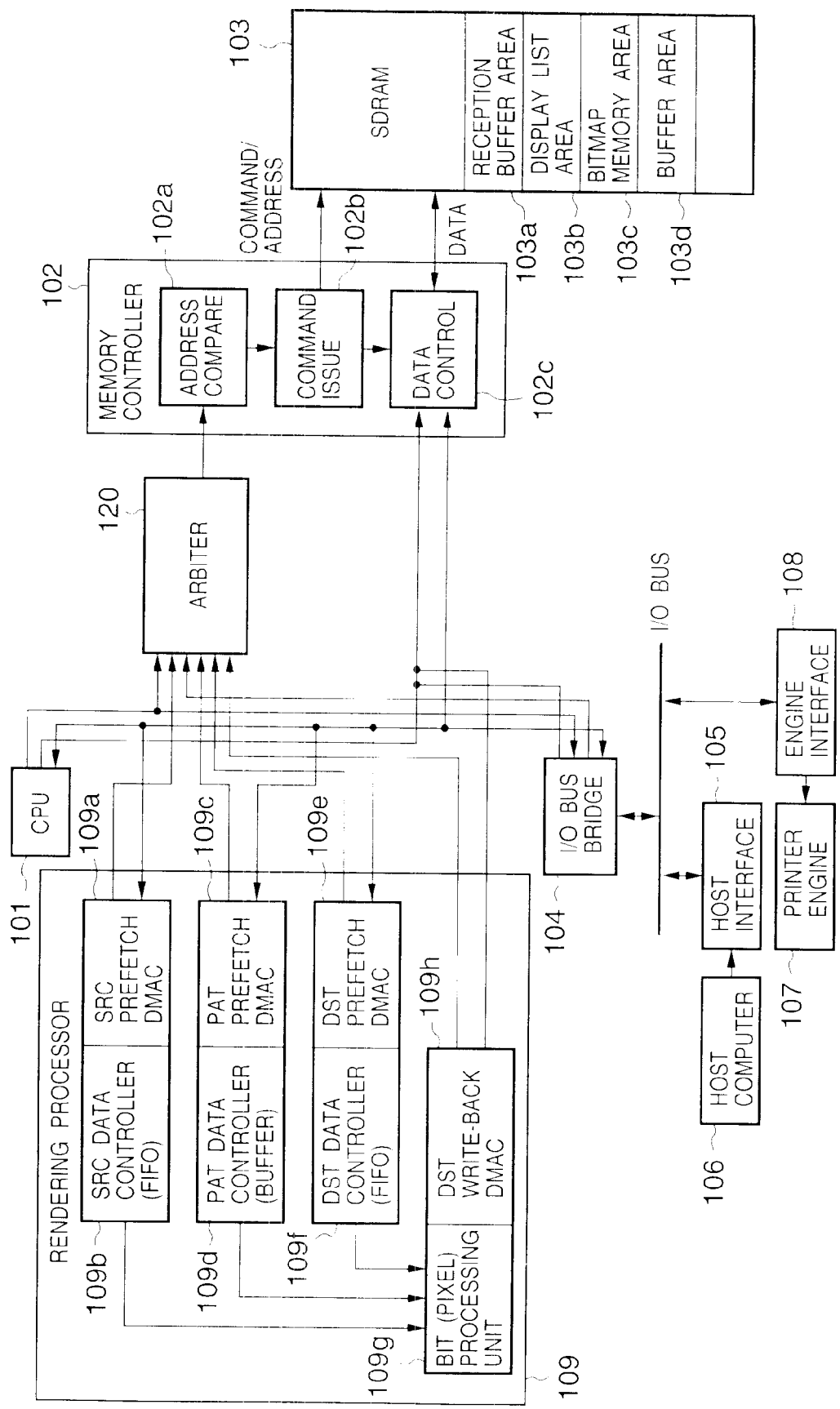

MEMORY CONTROLLER AND METHOD CONTROL METHOD, AND RENDERING DEVICE AND PRINTING DEVICE USING THE SAME

FIELD OF THE INVENTION

The present invention relates to a rendering device for forming an image in a printer, an image output apparatus of a multi-function system, or the like, and a memory controller and memory control method used in the device.

BACKGROUND OF THE INVENTION

Since a rendering device processes a large volume of image data, memory access performance has large influences on rendering performance. In order to improve the rendering performance, an arrangement including a prefetch circuit has been proposed. Since the prefetch circuit reads out data to be processed in advance, rendering performance drop upon memory access congestion can be minimized. The arrangement including the prefetch circuit can obtain higher rendering performance than that without prefetch even when it does not suffer memory access congestion.

However, since source data, pattern data, destination data, and the like the rendering device fetches from the memory have different memory access sequences, memory accesses cannot be optimized even when these data are prefetched by a single prefetch circuit, thus disturbing improvement of the rendering performance.

Furthermore, even in the prefetch mode, if single accesses are repeated without burst mode transfer, the memory access overhead increases, thus disturbing improvement of the rendering performance of the rendering device.

For example, when a character of around 10 points, a rendering object having a size equivalent to such character, or the like is rendered at 600 dpi/1 bpp/A4 upon forming an image by a rendering device, the rendering width onto a bitmap memory ranges from 60 dots to 100 dots. With this rendering width, memory access to the bitmap memory does not often match burst boundaries. Addresses that do not match burst boundaries are divisionally accessed by a plurality of single accesses in place of the burst mode, even when they are successive addresses in a page of a DRAM. For this reason, the memory access overhead increases, thus disturbing improvement of the rendering performance of the rendering device.

When an EDODRAM is used as a memory device, since it is designed to precharge every access, the access time upon page miss is the same as that upon page hit. For example, in a printer controller which outputs an image on an A4-paper sheet in a landscape mode at a resolution of 600 dpi, a page hit occurs during rendering of a line stored in a band memory, and a page miss is highly likely to occur upon starting a new line. If an EDODRAM is used as a band memory, the access time upon page miss is the same as that upon page hit. For this reason, it is effective to prefetch the first data of the next line even upon starting a new line.

By contrast, when an SDRAM or the like is used as a memory device, a memory controller which has independent read and precharge commands, and checks a page hit/miss in units of accesses to switch whether to issue a precharge command is normally used. With this controller, the memory access latency upon page hit becomes short, and the memory access performance improves. When the conventional prefetch circuit is applied to a rendering circuit using an SDRAM, at the end of a given line (to be referred to as a current line hereinafter), an access sequence (1) to prefetch the first data in the next line, (2) to write back data at the end of the current line, (3) and to prefetch the next data in the next line are generated. Since these three memory accesses access different lines and result in a page miss, precharge commands are generated three times in correspondence with transactions, resulting in a long rendering time.

SUMMARY OF THE INVENTION

The present invention has been made in consideration of the aforementioned prior art, and has as its object to provide a memory controller and memory control method, which can optimize memory accesses to improve the memory access speed, can reduce the single access overhead, can decrease the number of times of precharge upon starting a new line in rendering, and can improve the performance of a rendering circuit, and a rendering device which improves its rendering performance using the memory controller.

In order to achieve the above object, the present invention comprises the following arrangement.

A memory access controller comprises:
 processing means for issuing a transaction of memory operation together with a memory address to be designated;
 a queue for storing the transaction issued by the processing means; and
 control means for issuing a command to a memory by reading out the transaction stored in the queue, and controlling access to the designated address.

Alternatively, a memory access controller comprises:
 processing means having a plurality of DMA controllers for respectively accessing corresponding memory areas;
 arbitration means for arbitrating transactions issued by the DMA controllers of the processing means; and
 control means for issuing commands to a memory on the basis of the transactions arbitrated by the arbitration means, and controlling access to designated addresses.

Alternatively, a memory access controller comprises:
 a memory which can be accessed in a page mode;
 prefetch means for prefetching data from the memory; and
 write-back means for writing back data to the memory,
 wherein when it is determined that a page miss is likely to occur as a result of a prefetch, the prefetch is postponed until the write-back means writes back immediately preceding data.

Alternatively, a rendering device comprises:
 a memory;
 processing means having a plurality of DMA controllers for respectively accessing a plurality of areas of the memory, and image processing means for processing image data read from the plurality of areas; and
 control means for issuing commands to the memory on the basis of the transactions issued by the DMA controllers of the processing means, and controlling access to designated addresses.

Preferably, the device further comprises a queue for storing the transactions issued by the processing means, and the control means issues the commands to the memory by reading out the transactions stored in the queue, and controls access to the designated addresses.

Preferably, the processing means has, as the plurality of DMA controllers, a first controller for reading out data from an area in which generated data is to be written, and a second controller for writing back data to that area, and postpones a prefetch by the first controller until the second controller writes back immediately preceding data, when it is determined that a page miss is likely to occur as a result of the prefetch of the first controller.

Preferably, the processing means further has, as the plurality of DMA controllers, a third controller for reading out source data to be rendered, and the third controller prefetches successive addresses.

Preferably, the processing means further has, as the plurality of DMA controllers, a fourth controller for reading out a pattern to be rendered, and the fourth controller inhibits a prefetch of any more data when a width of the pattern falls within a buffer of the fourth controller. Preferably, the device further comprises means for outputting data written back by the second controller to the memory.

Preferably, the first controller checks if a prefetch of one line is complete, and determines that a page miss is likely to occur if the prefetch is complete.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the arrangement of a device according to the first embodiment of the present invention;

FIGS. 3A to 8B are timing charts showing memory access sequences generated by a rendering circuit of the first embodiment;

FIG. 9 is a flow chart showing the processing sequence of a destination prefetch DMAC 109e;

FIG. 11 is a flow chart showing the processing sequence of a source prefetch DMAC 109a;

FIG. 12 is a flow chart showing the processing sequence of a pattern prefetch DMAC 109c;

FIGS. 13A and 13B are timing charts showing an example of improved memory access to destination data; and FIG. 14 is a block diagram showing the arrangement of a device according to the second embodiment of the present invention.

DETAILED DESCRIPTION OF THE PREFERRED EMBODIMENTS

First Embodiment

Figure 2A:
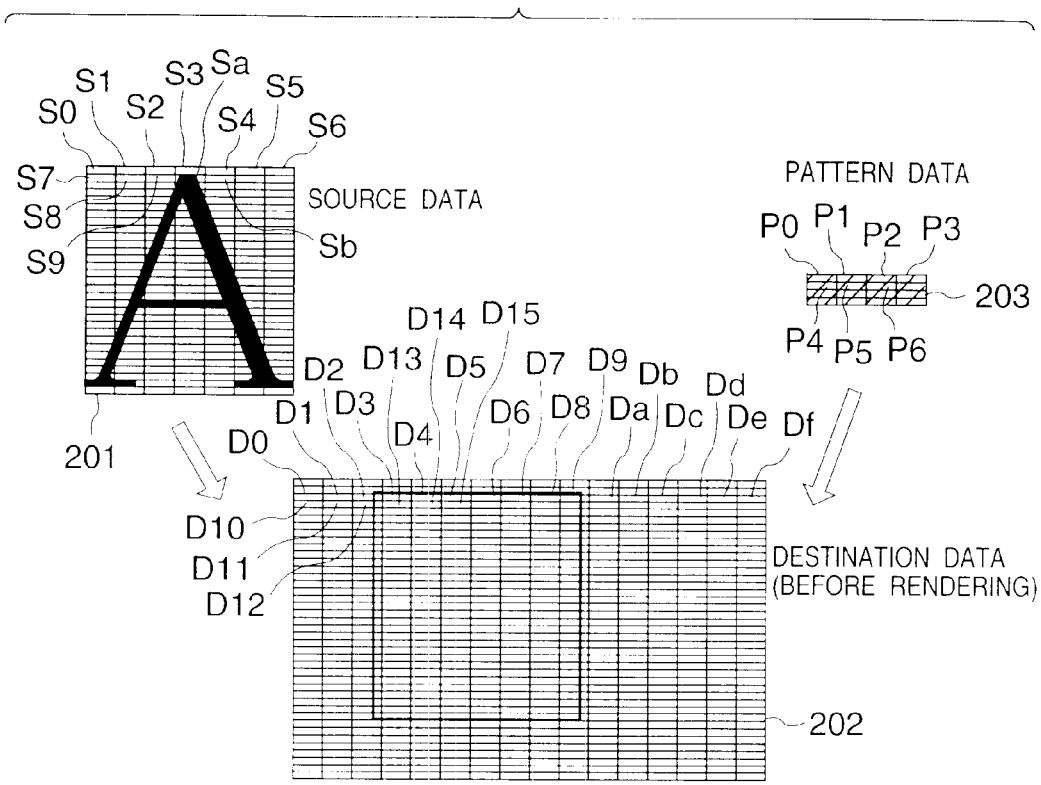
FIG. 2A illustrates rendering operation.

FIG. 1 is a block diagram showing the arrangement of a rendering device of this embodiment. A host computer 106 generates print information and transfers it to a printer via a host interface 107. The print information sent from the host interface 107 is stored in a reception buffer area 103a of an SDRAM 103 via an I/O bus, I/O bus bridge 104, transaction queue 110, write buffer 111, and memory controller 102. The stored print information is processed by a CPU 101, which generates a display list in a display list storage area 103b of the SDRAM 103.

When the CPU 101 starts a rendering processor 109, source prefetch DMAC 109a, pattern prefetch DMAC 109c, and destination prefetch DMAC 109e as DMACs in the rendering processor 109 issue data read transactions. The data read transactions are enqueued and ordered in the transaction queue 110, and undergo a pipeline process by an address comparator 102a, command issuer 102b, and data controller 102c, thus fetching source, pattern, and destination data from the display list storage area 103b of the SDRAM 103. The transactions to be enqueued include their transaction contents. Also, for example, a read transaction includes address and a write transaction includes address and data. Since the transaction queue 110 is present, the prefetch DMACs 109a, 109c, and 109e can prefetch read transactions of successive single accesses without waiting for data, and since the successive transactions are stored in the transaction queue 110, the pipeline process of the memory controller does not stop. As a result, the successive single accesses can realize throughput as high as that of burst access.

A source data controller 109b always prefetches successive addresses. The source data fetched from the SDRAM 103 is sent from the source prefetch DMAC 109a to the source data controller 109b, and the source prefetch DMAC 109a issues a data read transaction for fetching the next data.

A pattern data controller 109d has a function of comparing the pattern width and buffer size, and a function of inhibiting fetching of any more data until a new line starts when the pattern width falls within the buffer. Pattern data fetched from the SDRAM 103 is sent from the pattern prefetch DMAC 109c to the pattern data controller 109d, and the pattern prefetch DMAC 109c issues a data read transaction for fetching the next data if the pattern width falls outside the buffer.

A destination data controller 109f has a function of prefetching data at successive addresses during rendering of the current line, and postponing a prefetch of the next line until a write-back of the current line is completed upon starting a new line. Destination data fetched from a bitmap memory area 103c of the SDRAM 103 is sent from the destination prefetch DMAC 109e to the destination data controller 109f, and the destination prefetch DMAC 109e issues a data read transaction for fetching the next data. At this time, if the end of the rendering line is reached, the destination prefetch DMAC 109e does not issue a read transaction of the next data: until the last write-back transaction of that line is issued. With this control, upon starting a new line at which a page miss is highly likely to occur, generation of a page miss is minimized by successively accessing an identical line.

In this manner, since the data controllers have their DMACs, they can change prefetch sequences to match data to be fetched in accordance with the data to be fetched.

When data are prepared in the source data controller 109b, pattern data controller 109d, and destination data controller 109f, a pixel processing unit 109g makes logic operations and transfers destination data as an operation result to a destination write-back DMAC 109h, which issues a write-back transaction to write back the operation result in the bitmap memory area 103c of the SDRAM 103. At this time, the transaction is enqueued in the transaction queue 101, and write data is stored in the write buffer 111, which holds that write data until a write transaction is executed by the memory controller 102. In this manner, when bitmap data is generated in the bitmap memory area of the SDRAM 103, the CPU 101 starts an engine interface 108 to transfer the bitmap data stored in the SDRAM 103 to a print engine 107, thus forming an image on a recording medium.

Figure 2B:
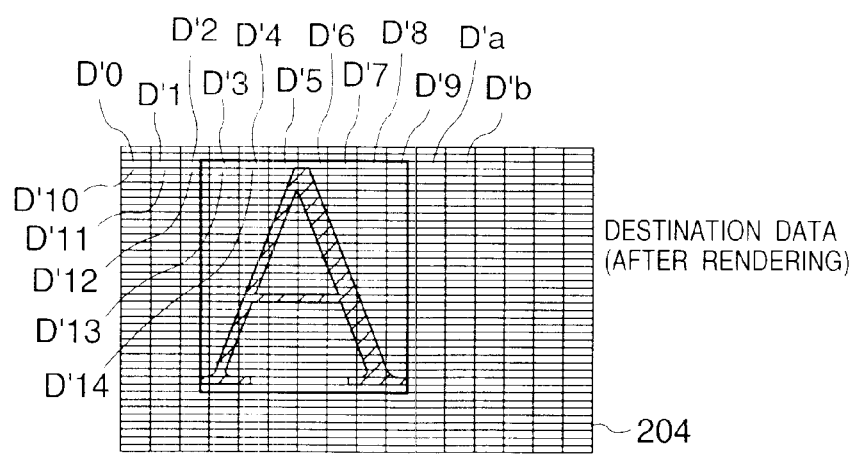
FIG. 2B illustrates rendering operation.

FIGS. 2A and 2B illustrate rendering operation. The rendering process is implemented by updating destination data 202 stored in the bitmap area 103c using source data 201 and pattern data 203 stored in the display list area 103b or a buffer area 103d to obtain data 204. The source prefetch DMAC 109a fetches source data S0, S1, S2, and S3 from the SDRAM 103, transfers them to the source data controller 103b, and issues a read transaction for prefetching subsequent data S4, S5, S6, and S7. The pattern prefetch DMAC 109c fetches pattern data P0, P1, P2, and P3 from the SDRAM 103, transfers them to the pattern data controller 103d, and stops prefetch of subsequent data P4, P5, P6, and P7 since the pattern width is equal to or smaller than the buffer size of the pattern data controller 103d. The destination prefetch DMAC 109e fetches destination data D2 and D3 from the SDRAM 103, transfers them to the destination data controller 103f, and issues a read transaction for prefetching subsequent data D4, D5, D6, and D7. Assume that first source data S0 and first pattern data P0 match a burst boundary, and first destination data D2 of the rendering range does not match a burst boundary.

The pixel operation (processing) unit 109g generates destination data D2' and D3' on the basis of source data S0 and S1, pattern data P0 and P1, and destination data D2 and D3, and transfers them to the write-back DMAC 109h. The write-back DMAC 109h issues a write transaction for writing destination data D2' and D3' in the bitmap area 103c of the SDRAM 103.

Parallel to pixel operations, the destination prefetch DMAC 109e fetches destination data D4, D5, D6, and D7 from the SDRAM 103, transfers them to the destination data controller 103f, and issues a read transaction for prefetching subsequent data D8, D9, Da, and Db. Parallel to pixel operations as well, the source prefetch DMAC 109a fetches source data S4, S5, S6, and S7 from the SDRAM 103, transfers them to the source data controller 109b, and issues a read transaction for prefetching subsequent data S8, S9, Sa, and Sb.

When the pixel operation unit 109g generates destination data D4', D5', D6', and D7' on the basis of source data S2, S3, S4, and S5, pattern data P2, P3, P0, and P1, and destination data D4, D5, D6, and D7, and transfers them to the write-back DMAC 109h, a free space is formed in the FIFO of the destination data controller 109f. For this reason, the prefetch DMAC 109e can issue a read transaction for the next data. However, since the rendering range of destination data is up to D9, the prefetch DMAC 109e waits until the write-back DMAC 109h issues a write transaction of destination data D8' and D9' used to detect a line end, and then issues a read transaction for the first data of the next line.

The source data 201 is saved not only as bitmap data but also as compressed data or edge data, and conversion from these data into bitmap data shown in FIGS. 2A and 2B is implemented by the source data controller 109b.

FIGS. 3A to 8B are timing charts showing memory access sequences generated by the rendering processor 109 of this embodiment. FIGS. 3A–3B, 4A–4B, 5A–5B, and 6A–6B respectively show the timings at which the source prefetch DMAC, pattern prefetch DMAC, destination prefetch DMAC, and destination write-back DMAC issue transactions to the transaction queue 110 and write buffer 111. These figures show address signal AddrX[31:2], signal TxX indicating that address is valid, signal ActX indicating queuing of a transaction, signal DataRdyX indicating that data is valid, and data signal DataX[31:0]. FIGS. 7A and 7B show commands issued from the memory controller 102 to the SDRAM 103, and data to or from the SDRAM. Furthermore, FIGS. 8A and 8B show data read, processing, and write-back sequences by the rendering processor 109. Note that numerals enclosed in circles in these figures indicate the order of transactions to be enqueued. These numerals are assigned to have acknowledge signal AckX from the transaction queue as a representative signal. Also, identical numbers are assigned to commands issued by the memory controller 102 in correspondence with transactions and data read out from and written in the SDRAM by the commands. In the following description, these numerals enclosed in circles will be referred to as transaction numbers in parentheses.

In order to fetch first data D2 within the rendering range, the destination prefetch DMAC 109e drives address A(D2) where data D2 is stored onto address bus AddrDst[31:2], asserts signal TxDst_L indicating that the transaction address is valid, and issues single read transaction (1). In response to this transaction, the transaction queue 110 asserts signal AckDst_L indicating that the transaction has been enqueued, and the address phase of transaction (1) comes to an end. Subsequently, in order to fetch next data D3, the destination prefetch DMAC 109e drives address A(D3) where data D3 is stored onto address bus AddrDst [31:2], asserts signal TxDst_L indicating that the transaction address is valid, and issues single read transaction (2).

At the same time, the memory controller 102 fetches memory read transaction (1) to address A(D2), which is stored in the transaction queue 110, and issues a memory read command to address A(D2) to the SDRAM. Subsequently, the memory controller 102 receives memory read transaction (2) to address A(D3), which is stored in the transaction queue 110, and issues a memory read command to address A(D3) to the SDRAM.

After that, since the SDRAM drives data D2 onto an SDRAM data bus, the memory controller 102 fetches that data, drives D2 onto data bus DataDst[31:0] to pass it on to the destination prefetch DMAC 109e, asserts signal DataRdyDst indicating that the data is valid, and passes data D2 on to the destination prefetch DMAC 109e. Furthermore, since the SDRAM drives data D3 onto an SDRAM data bus, the memory controller 102 fetches that data, drives D3 onto data bus DataDst[31:0] to pass it on to the destination prefetch DMAC 109e, asserts signal DataRdyDst indicating that the data is valid, and passes data D3 on to the destination prefetch DMAC 109e.

This single read or single write is similarly made for transactions (7), (8), (9), (10), and the like in FIGS. 3A to 8B upon reading/writing data to/from addresses that do not match a burst boundary.

In this manner, transactions issued by the prefetch DMAC are enqueued in the transaction queue, and the memory controller processes the transactions stored in the transaction queue in turn. For this reason, transactions can be asynchronously issued and processed via the transaction queue. Therefore, as described above, even in a single read, the prefetch DMAC can successively issue another memory read transaction before it receives data read out in response to a command. The issued transactions are processed in turn in the order they were issued, and in case of a read transaction, readout data is passed to the source of that transaction. Hence, the system of this embodiment can realize high throughput equivalent to that of burst transfer even in single transfer.

Figure 3B:
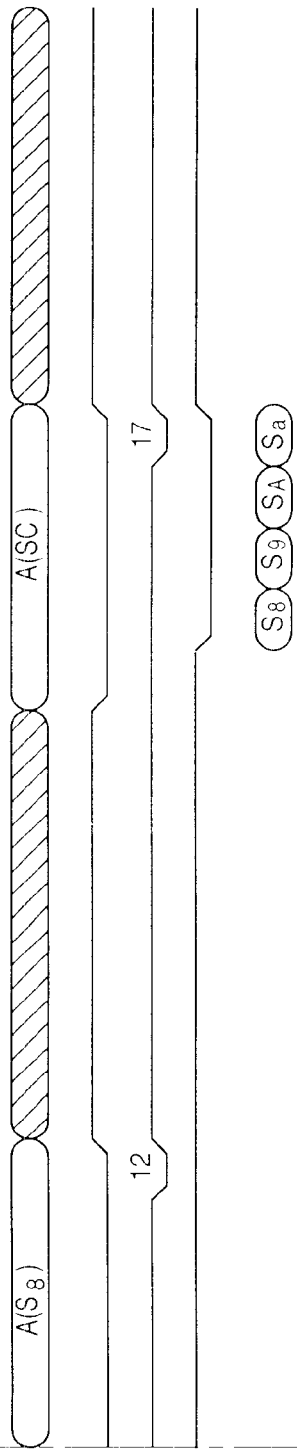
Figure 4B:
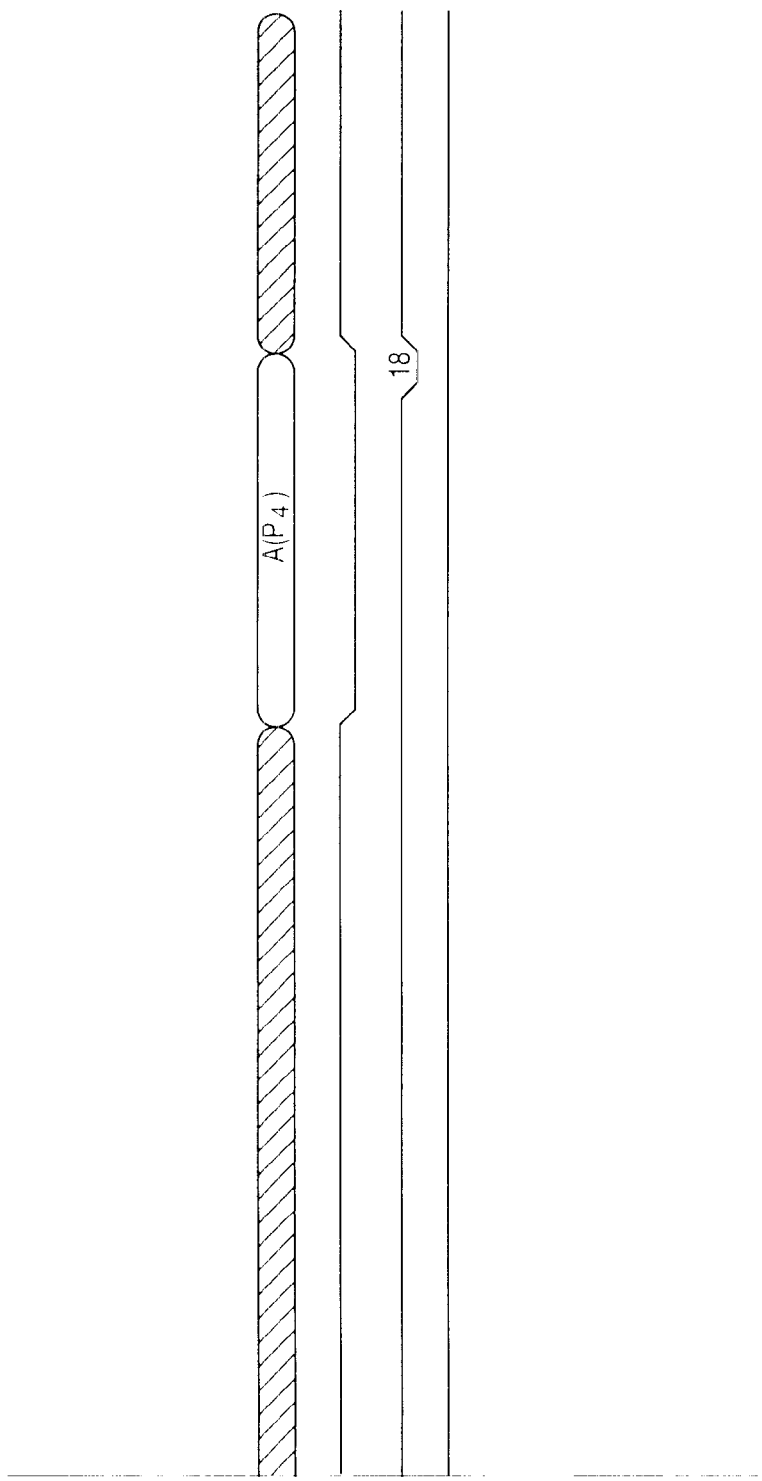
Figure 6A:
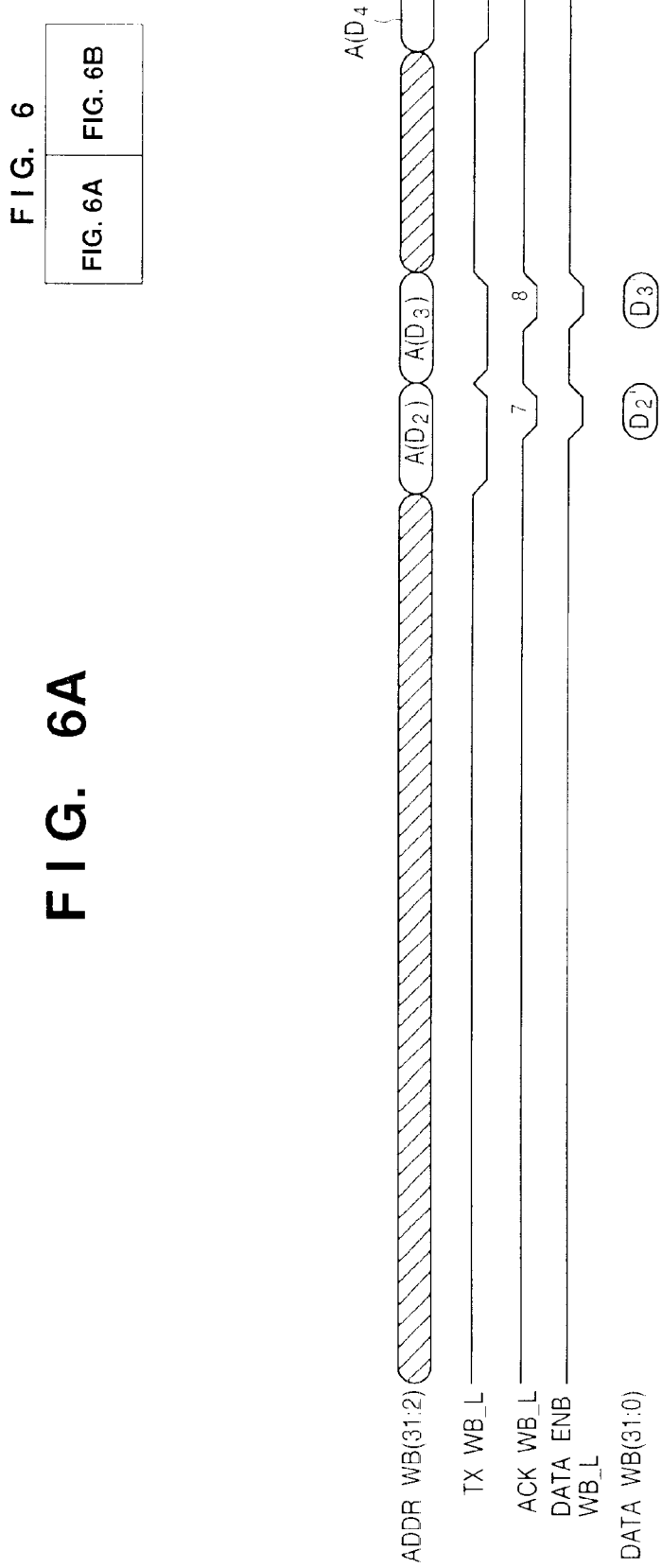
Figure 6B:
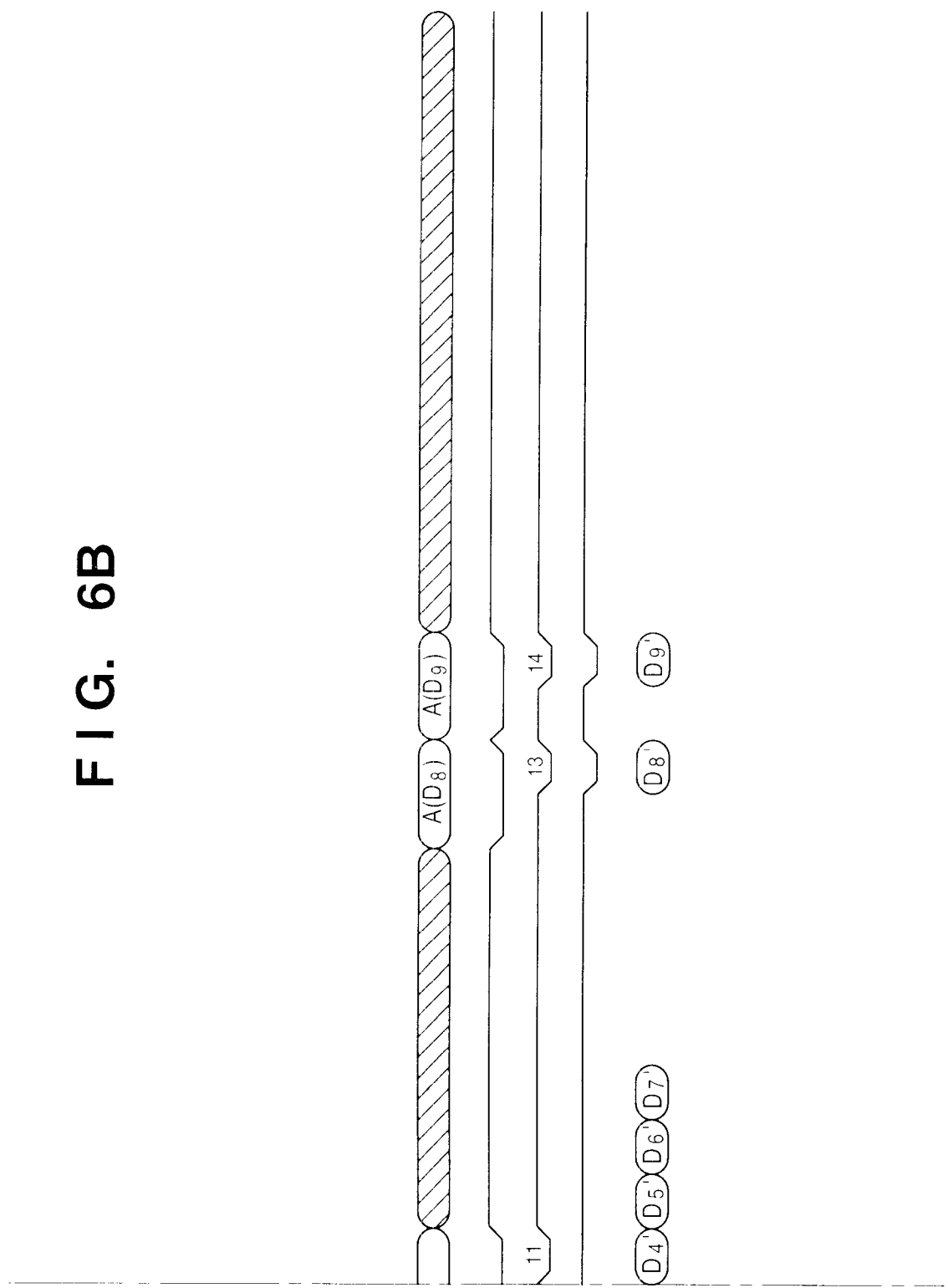
Figures 7, 7A:
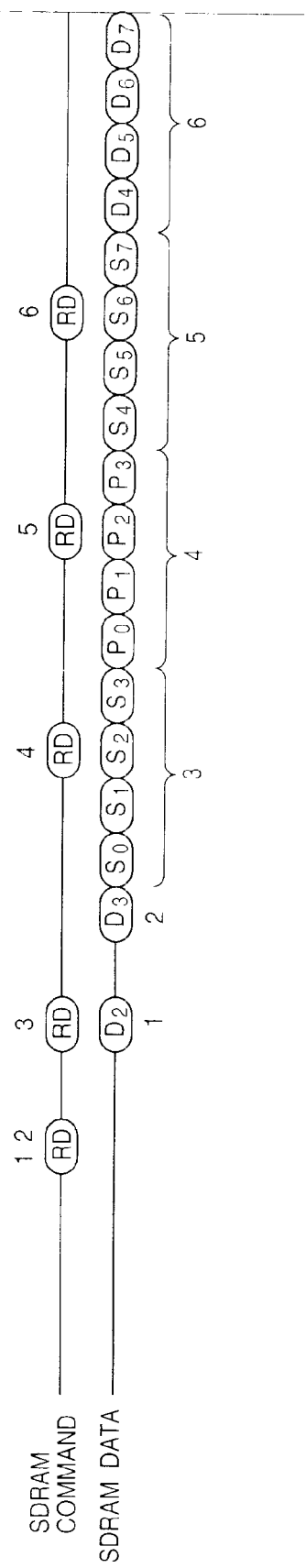

FIGS. 3A and 3B illustrate the memory access sequences by the rendering processor 109 of this embodiment. The interface between this rendering processor and memory controller is separated into an address phase and data phase along with an elapse of time, as can be seen from FIGS. 3A to 8B.

At the first burst in the first line, since the source prefetch DMAC 109a, pattern prefetch DMAC 109c, and destination prefetch DMAC 109e issue data read transactions at the same timing, a destination read (301), source read (302), and pattern read (303) are successively generated. Until a destination write (304), a delay time is inserted due to logic operations of the bit processing unit 109g. During this interval, source and destination prefetches (305, 306) of the second burst are generated, and their arithmetic processes are done parallel to the destination write (304) of the first burst. Since pattern data has a width falling within the buffer of the pattern data controller 109d, data is not fetched until a new line starts. After that, a destination read (308) of the third burst generated in a gap between memory accesses of a write-back (304) of the first burst and a write-back (307) of the second burst, and a destination write (307) of the second burst follows.

Next, a source fetch (310) follows. In this case, since source data of the first line have already been fetched, this source fetch corresponds to source data of the second lines. After that, the last write-back (309) of the first line is generated.

At this time, since a new line starts, the destination prefetch DMAC 109e stops a prefetch of destination data, and generates a destination read (311) for the first burst of the second line after the last write-back (309) of the first line is generated. This is to avoid three consecutive page misses that result in a precharge every time they occur.

FIGS. 13A and 13B are timing charts showing different sequences of the destination prefetch sequence DMAC with and without waiting for a write-back of the current line upon starting a new line. Upper chart (A) corresponds to the former, and lower chart (B) the latter.

When data of the next line is prefetched without waiting for a write-back of the current line, data D12 and D13 at the head of the next line are read (806) after a write (802) of destination data D4', D5', D6', and D7'. Since the line to be accessed has changed, a page miss occurs, and a precharge is issued. Since destination data D8' and D9' are then written (804), another precharge is issued. Furthermore, since subsequent destination data D14 and D15 of the next line are read (805), a precharge is generated once again.

By contrast, when a prefetch of the next line before a write-back of the current line is inhibited upon starting a new line, so far as destination data are concerned, destination data D8' and D9' are written after a write (802) of destination data D4', D5', D6', and D7', in place of a read of data D12 and D13 at the head of the next line. For this reason, no precharge is generated due to a page hit, and a read of data D12 and D13 at the head of the next line is generated and results in a page miss, thus issuing a precharge. However, since a read of the next destination data D14 and D15 results in a page hit, no precharge is issued. In this manner, by inhibiting a prefetch upon starting a new line, the number of times of precharge can be reduced from three to one.

FIG. 9 is a flow chart showing the processing sequence of the destination prefetch DMAC 109e. The destination prefetch DMAC 109e checks first if rendering starts (401).

If NO in step 401, the prefetch DMAC 109e waits until rendering starts; otherwise, the prefetch DMAC 109e computes the rendering start address (402). The prefetch DMAC 109e issues a data read transaction to the computed address (403), and then checks if rendering is complete (404). If YES in step 404, the prefetch DMAC 109e waits until the next rendering starts (401); otherwise, it checks if a line end has been reached (405). If NO in step 405, the prefetch DMAC 109e computes the address for fetching the next data (406), and checks if the FIFO of the destination data controller 109f does not overflow when it issues the next read transaction (408). If the FIFO overflows, the prefetch DMAC 109e waits until a sufficiently large free space is formed on the FIFO (408). If the FIFO does not overflow, the prefetch DMAC 109e repeats issuance of the next data read transaction from step 403.

If the line end has been reached in step 405, the prefetch DMAC 109e waits until a write-back of the current line is completed (409). Upon completion of the write-back, the prefetch DMAC 109e computes the address of the next line (407), and checks if the FIFO of the destination data controller 109f does not overflow when it issues the next read transaction (408). If the FIFO overflows, the prefetch DMAC 109e waits until a sufficiently large free space is formed on the FIFO (408). If the FIFO does not overflow, the prefetch DMAC 109e repeats issuance of the next data read transaction from step 403.

Figure 10:
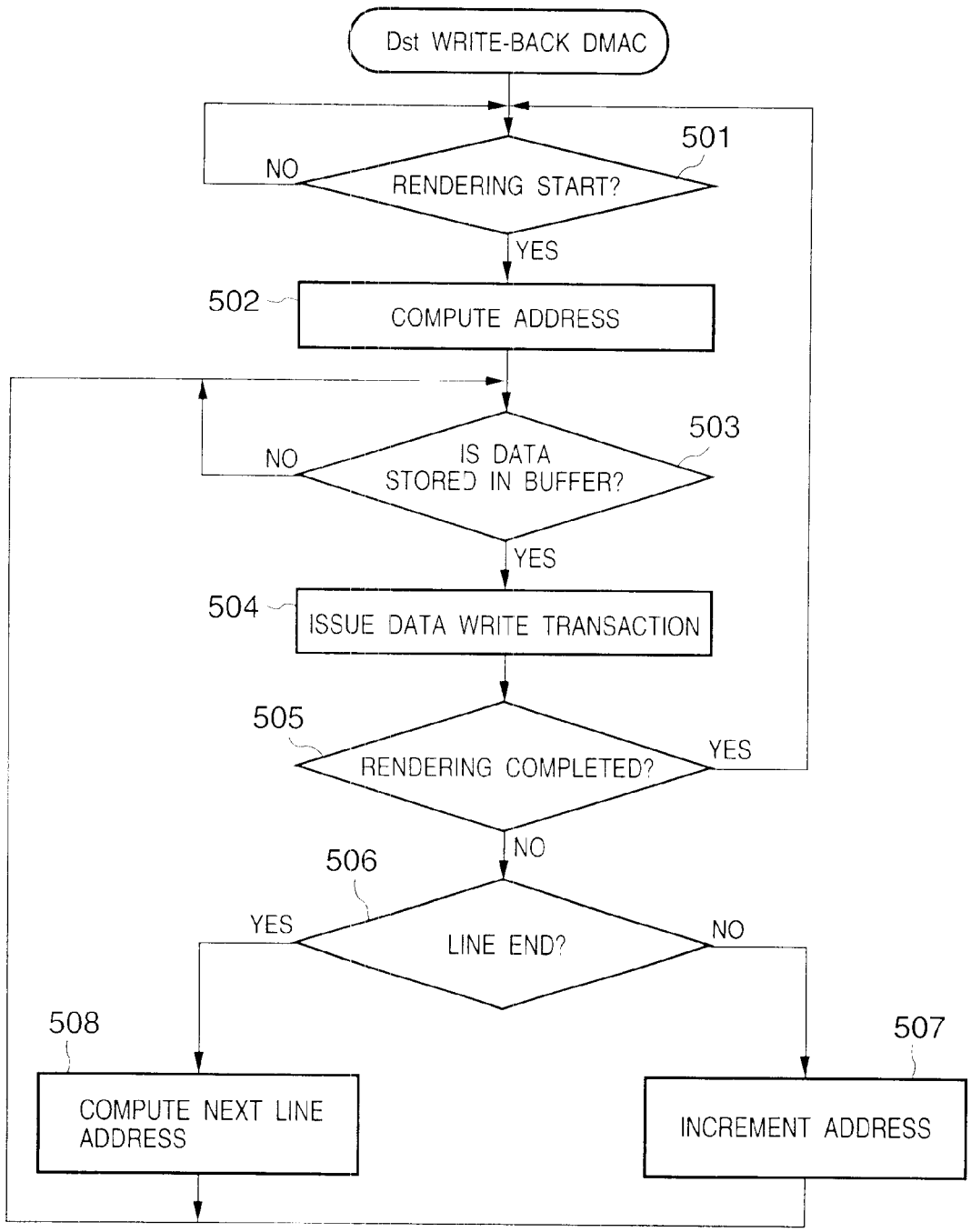
FIG. 10 is a flow chart showing the processing sequence of a destination write-back DMAC 109h.

FIG. 10 is a flow chart showing the processing sequence of the destination write-back DMAC 109h. The destination write-back DMAC 109h checks first if rendering starts (501). If NO in step 501, the write-back DMAC 109h waits until rendering starts; otherwise, it computes the rendering start address (502). The write-back DMAC 109h then checks if data to be written back is stored in the buffer (503). If NO in step 503, the write-back DMAC 109h waits until data is generated and stored in the buffer (503). On the other hand, if YES in step 503, the write-back DMAC 109h issues a data write transaction to the computed address (504), and checks if rendering is complete (505). If YES in step 505, the write-back DMAC 109h waits until the next rendering starts (501); otherwise, it checks if a line end has been reached (506). If NO in step 506, the write-back DMAC 109h computes the address for fetching the next data (507), and waits for the next data to be written back (503). If the line end has been reached (506), the write-back DMAC 109h computes the address of the next line (508), and waits for the next data to be written back (503).

Figure 11:
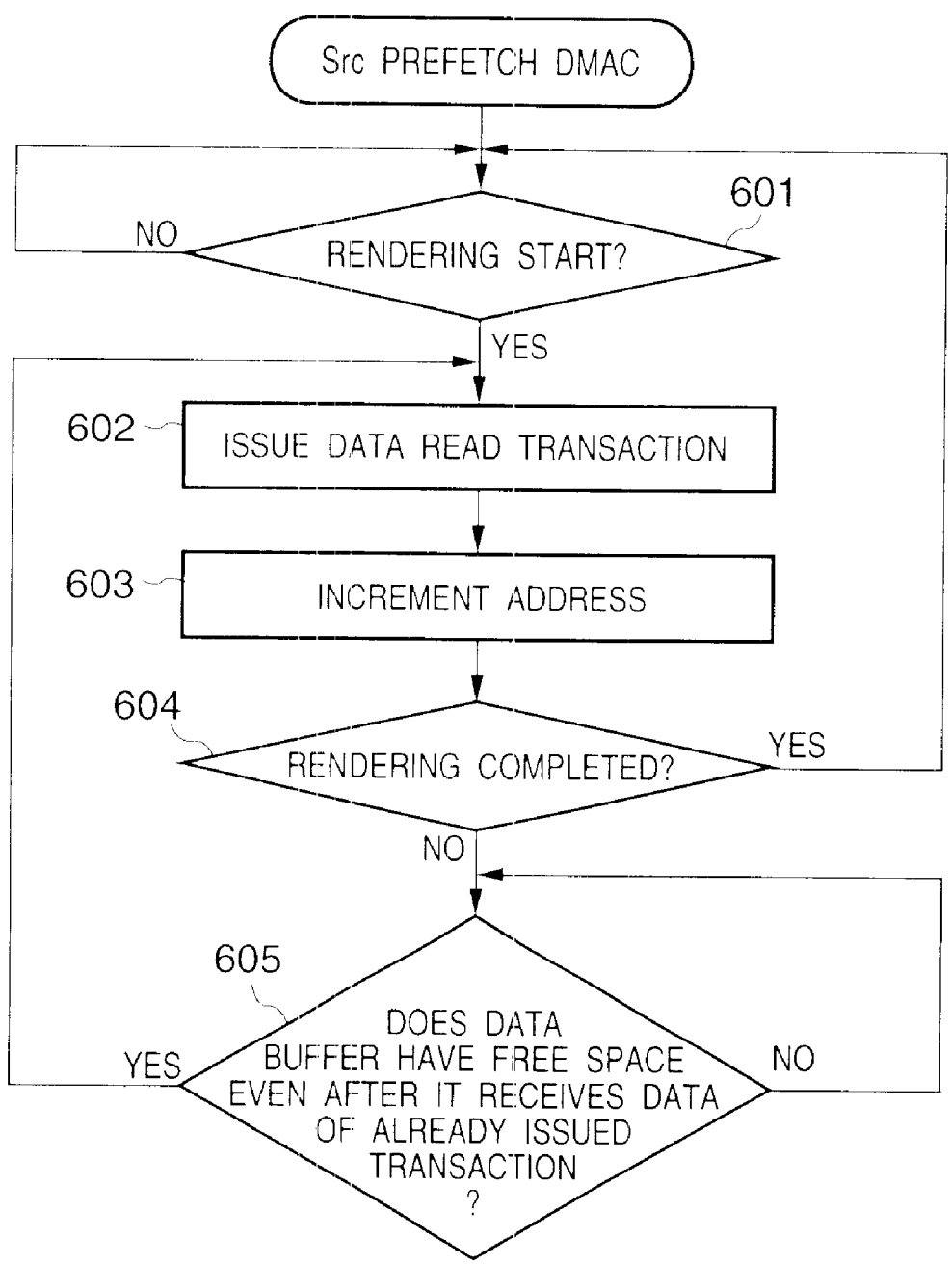

FIG. 11 is a flow chart showing the processing sequence of the source prefetch DMAC 109a. The source prefetch DMAC 109a checks first if rendering starts (601). If NO in step 601, the prefetch DMAC 109a issues a data read transaction (602), computes the next address (603), and checks if rendering is complete (604). If YES in step 604, the prefetch DMAC 109a waits until the next rendering starts (601); otherwise, it checks if the FIFO of the source data controller 109b does not overflow when it issues the next read transaction (605). If the FIFO does not overflow, the prefetch DMAC 109a issues the next data read transaction (602); otherwise, it waits until a sufficiently large free space is formed on the FIFO (605).

FIG. 12 is a flow chart showing the processing sequence of the pattern prefetch DMAC 109c. The pattern prefetch DMAC 109c checks first if rendering starts (701). If NO in step 701, the prefetch DMAC 109c waits until rendering starts; otherwise, it computes the rendering start address (702). The prefetch DMAC 109c then issues a data read transaction to the computed address (703), and checks if the pattern width is larger than the buffer size of the pattern data controller 109*d* (704). If YES in step 704, the prefetch DMAC 109*c* checks if a line end has been reached (706). If NO in step 706, the prefetch DMAC 109*c* checks if the data of interest is the last data of the current line (707). If NO in step 707, the prefetch DMAC 109*c* increments the address (708). However, if YES in step 707, the prefetch DMAC 109*c* computes the start address of the current line (709). If the pattern width is smaller than the buffer size of the pattern data controller 109*d* (704), the prefetch DMAC 109*c* checks if a line end has been reached (705). If NO in step 705, the prefetch DMAC 109*c* waits for the line end; otherwise, it checks if the last line has been exceeded (710). If YES in step 710, the prefetch DMAC 109*c* computes the start address of a pattern (711); otherwise, it computes the address of the next address (712). The prefetch DMAC 109*c* then checks if rendering is complete (713). If YES in step 713, the prefetch DMAC 109*c* waits for the next rendering starts (701); otherwise, it checks if the FIFO of the pattern data controller 109*d* does not overflow when it issues the next read transaction (714). If the FIFO does not overflow, the prefetch DMAC 109*c* issues the next data read transaction (703); otherwise, it waits until a sufficiently large free space is formed on the FIFO.

In this manner, since independent prefetch DMACs are provided in units of data, and read or write data in sequences optimal to their data, the memory access sequences of the rendering processor can be optimized, thus improving the rendering performance.

Each prefetch DMAC issues a data read or data write transaction to the transaction queue, and makes it enqueue the transaction. The enqueued transactions are dequeued by the memory controller 102 in the FIFO order, and commands and addresses corresponding to the transactions are issued to the SDRAM.

Since the transaction queue is inserted between the rendering processor and memory controller, as described above, the rendering processor can issue data read and write transactions asynchronous with the transaction processes by the memory controller. In this way, a single prefetch DMAC in the rendering processor can successively issue single read and write transactions, and a processing speed as high as burst transfer can be achieved.

Upon detecting a line end, since the order of memory accesses is adjusted to inhibit a prefetch of the next line until the access to that line is completed, generation of page misses of that line is minimized. As a result, the number of times of precharge is reduced, and high-speed DRAM access can be realized.

Second Embodiment

In the first embodiment, DMACs are provided to each of the data controllers and bit processing unit in the rendering processor 109, and transactions issued by those DMACs are stored in the transaction queue 110. However, if the transaction queue is omitted, faster memory transactions can be achieved by providing DMACs in units of processing units. FIG. 14 shows the arrangement corresponding to that shown in FIG. 1 from which the transaction queue 110 is omitted, and the respective controllers and bit processing unit in the rendering processor 109 comprise DMACs.

Referring to FIG. 14, when the CPU 101 starts the rendering processor 109, the source prefetch DMAC 109*a*, pattern prefetch DMAC 109*c*, and destination prefetch DMAC 109*e* as DMACs in the rendering processor 109 issue data read transactions. The data read transactions are ordered by an arbiter 110, and undergo a pipeline process by an address comparator 102*a*, command issuer 102*b*, and data controller 102*c*, thus fetching source, pattern, and destination data from the display list storage area 103*b* of the SDRAM 103.

Source data fetched from the SDRAM 103 is sent from the source prefetch DMAC 109*a* to the source data controller 109*b*, and the source prefetch DMAC 109*a* issues a data read transaction for fetching the next data. Pattern data fetched from the SDRAM 103 is sent from the pattern prefetch DMAC 109*c* to the pattern data controller 109*d*, and the pattern prefetch DMAC 109*c* issues a data read transaction for fetching the next data. Destination data fetched from the bitmap memory area 103*c* of the SDRAM 103 is sent from the destination prefetch DMAC 109*e* to the destination data controller 109*f*, and the destination prefetch DMAC 109*e* issues a data read transaction for fetching the next data. At this time, if the rendering line has reached its end, the destination prefetch DMAC 109*e* does not issue the next data read transaction until the last write-back transaction of that line is issued. This process has been explained previously with reference to FIGS. 13A and 13B.

When data are prepared in the source data controller 109*b*, pattern data controller 109*d*, and destination data controller 109*f*, the pixel processing unit 109*g* makes logic operations and transfers destination data as an operation result to the destination write-back DMAC 109*h*, which issues a write-back transaction to write back the operation result in the bitmap memory area 103*c* of the SDRAM 103. In this manner, when bitmap data is generated in the bitmap memory area of the SDRAM 103, the CPU 101 starts the engine interface 108 to transfer the bitmap data stored in the SDRAM 103 to the print engine 107, thus forming an image on a recording medium.

In this way, since prefetch DMAC circuits are independently prepared, data can be fetched in optimal sequences without using any transaction queue, and memory accesses of the rendering circuit can be optimized.

Upon fetching destination data, data of subsequent addresses may be prefetched during rendering of a given line, and the first data of the next line may be fetched upon starting a new line.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code (FIGS. 9 to 12) of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, since a transaction queue is provided, the throughput of memory accesses by single accesses of the rendering device can be improved, and even a relatively small rendering object can be rendered at high speed.

Since DMACs are provided in units of prefetch units, data can be read or written in their optimal sequences, and memory accesses of the rendering processor can be optimized, thus improving the rendering performance.

Upon detecting a line end, since the order of memory accesses is adjusted to inhibit a prefetch of the next line until the access to that line is completed, the number of times of precharge is reduced, and high-speed DRAM access can be realized.

As many apparently widely different embodiments of the present invention can be made without departing from the spirit and scope thereof, it is to be understood that the invention is not limited to the specific embodiments thereof except as defined in the appended claims.

What is claimed is:

1. A memory access controller comprising:
   a memory which can be accessed in a page mode;
   prefetch means for prefetching data from said memory; and
   write-back means for writing back data to said memory,
   wherein when it is determined that a page miss is likely to occur as a result of a prefetch, the prefetch is postponed until said write-back means writes back immediately preceding data.

2. A rendering device comprising:
   a memory;
   processing means having a plurality of DMA controllers for respectively accessing a plurality of areas of said memory, and image processing means for processing image data read from the plurality of areas; and
   control means for issuing commands to said memory on the basis of the transactions issued by the DMA controllers of said processing means, and controlling access to designated addresses,
   wherein said processing means comprises, as the plurality of DMA controllers, a first controller for reading out data from an area in which generated data is to be written, and a second controller for writing back data to that area, and postpones a prefetch by the first controller until the second controller writes back immediately preceding data, when it is determined that a page miss is likely to occur as a result of the prefetch of the first controller.

3. The device according to claim 2, further comprising a queue for storing the transactions issued by said processing means, and wherein said control means issues the commands to said memory by reading out the transactions stored in said queue, and controls access to the designated addresses.

4. The device according to claim 3, wherein said processing means further comprises, as the plurality of DMA controllers, a third controller for reading out source data to be rendered, and the third controller prefetches successive addresses.

5. The device according to claim 2, wherein said processing means further comprises, as the plurality of DMA controllers, a further controller for reading out a pattern to be rendered, and the fourth controller inhibits a prefetch of any more data when a width of the pattern falls within a buffer of the fourth controller.

6. The device according to claim 2, further comprising means for outputting data written back by the second controller to said memory.

7. The device according to claim 2, wherein the first controller checks whether a prefetch of one line is complete, and determines that a page miss is likely to occur if the prefetch is complete.

8. A memory control method that uses a memory which can be accessed in a page mode, prefetch means for prefetching data from the memory, and write-back means for writing back data to the memory, comprising the step of:
   checking whether a page miss is likely to occur as a result of a prefetch, and postponing the prefetch until the write-back means writes back immediately preceding data if it is determined that a page miss is likely to occur.

9. A storage medium which stores a computer program for controlling a memory which can be accessed in a page mode, prefetch means for prefetching data from the memory, and write-back means for writing back data to the memory, said program including a program code of:
   postponing a prefetch until the write-back means writes back immediately preceding data if it is determined that a page miss is likely to occur as a result of the prefetch.

10. A memory control apparatus comprising:
    memory access means for executing a read-modify-write together with a prefetch; and
    control means for controlling to inhibit said memory access means for making a prefetch upon starting a new line.

11. A memory control method comprising the steps of:
    executing a read-modify-write together with a prefetch; and
    executing a read-modify-write without a prefetch upon starting a new line.

12. A memory controller comprising:
    a pre-fetch unit adapted to prefetch data from a memory; and
    a write-back unit adapted to write data to the memory,
    wherein said prefetch unit determines whether or not data is prefetched to a line end and, when it is determined that the data is prefetched to the line end, postpones a prefetch until said write-back unit completes a write-back of the prefetched data.

13. A memory controller according to claim 12, further comprising a printing engine which performs printing based on the data stored in the memory.

14. A memory controller according to claim 12, wherein said prefetch unit includes a source prefetch unit prefetching a source data, pattern prefetch unit prefetching a pattern data and a destination prefetch unit prefetching a destination data.

15. A memory controller comprising:
    a prefetch unit including a source prefetch unit prefetching a source data from a memory prefetch unit prefetching a pattern data from the memory and a destination prefetch unit prefetching a destination data from the memory;
    an operation unit adapted to operate the source data, the pattern data and the destination data; and
    a write-back unit adapted to write back data operated by said operation unit to the memory, wherein said prefetch unit determines whether or not data is prefetched to a line end and, when it is determined that the data is prefetched to the line end, postpones a prefetch until said write-back unit completes a write-back of the prefetched data.

16. A memory controller according to claim 15, further comprising a printing engine which performs printing based on the data stored in the memory.

* * * * *

UNITED STATES PATENT AND TRADEMARK OFFICE
CERTIFICATE OF CORRECTION

PATENT NO. : 6,697,882 B1
DATED : February 24, 2004
INVENTOR(S) : Nobuaki Matsui It is certified that error appears in the above-identified patent and that said Letters Patent is hereby corrected as shown below:

Column 3,
Line 15, "Preferably," should read -- ¶ Preferably, --.

Column 4,
Line 49, "data:" should read -- data --.

Column 12,
Line 41, "a pre-fetch" should read -- a prefetch --.

Signed and Sealed this

Thirteenth Day of July, 2004

JON W. DUDAS
*Acting Director of the United States Patent and Trademark Office*